United States Patent [19]
McManus

[11] Patent Number: 5,676,735
[45] Date of Patent: Oct. 14, 1997

[54] RECLAIMING SYSTEM FOR GAS RECOVERY FROM DECOMMISSIONED GAS STORAGE AND DISPENSING VESSELS AND RECYCLE OF RECOVERED GAS

[75] Inventor: James V. McManus, Danbury, Conn.

[73] Assignee: Advanced Technology Materials, Inc., Danbury, Conn.

[21] Appl. No.: 741,926

[22] Filed: Oct. 31, 1996

[51] Int. Cl.⁶ ............................................. B01D 53/04
[52] U.S. Cl. ............................ 95/15; 95/17; 95/18; 95/21; 95/104; 95/106; 95/115; 95/127; 96/112; 96/113; 96/126; 96/130; 96/133; 96/144; 96/146
[58] Field of Search ........................... 95/14, 15, 17–22, 95/90, 95–106, 114, 115, 127, 133; 96/112, 113, 121, 122, 126–128, 130, 131, 133, 143–146

[56] References Cited

U.S. PATENT DOCUMENTS

| | | | |
|---|---|---|---|
| 240,423 | 4/1881 | James | 206/7 X |
| 1,608,155 | 11/1926 | Barnebey | 206/7 X |
| 2,356,334 | 8/1944 | Maude et al. | 206/7 X |
| 2,663,626 | 12/1953 | Spangler | 206/7 X |
| 2,987,139 | 6/1961 | Bush | 95/133 |
| 2,997,371 | 8/1961 | Wadsworth et l. | 95/131 X |
| 3,006,153 | 10/1961 | Cook | 206/7 X |
| 3,069,830 | 12/1962 | Skarstrom et al. | 95/99 |
| 3,116,132 | 12/1963 | Haller et al. | 95/132 X |
| 3,144,200 | 8/1964 | Taylor et al. | 96/108 X |
| 3,287,432 | 11/1966 | Sensel | 95/95 |
| 3,384,976 | 5/1968 | Westeren | 96/144 X |
| 3,675,392 | 7/1972 | Reighter | 95/96 |
| 3,713,273 | 1/1973 | Coffee | 96/128 X |
| 3,719,026 | 3/1973 | Sand | 95/106 |
| 3,788,036 | 1/1974 | Lee et al. | 96/130 X |
| 3,977,845 | 8/1976 | Walter | 95/100 |
| 4,023,701 | 5/1977 | Dockery | 206/7 X |
| 4,194,890 | 3/1980 | McCombs et al. | 95/98 X |
| 4,263,018 | 4/1981 | McCombs et al. | 96/130 X |
| 4,343,770 | 8/1982 | Simons | 206/7 X |
| 4,414,005 | 11/1983 | DeBiévre et al. | 95/127 |
| 4,496,376 | 1/1985 | Hradek | 96/126 X |
| 4,578,256 | 3/1986 | Nishino et al. | 95/133 X |
| 4,723,967 | 2/1988 | Tom | 95/90 |
| 4,738,693 | 4/1988 | Tom | 95/90 |
| 4,749,384 | 6/1988 | Nowobilski et al. | 96/108 X |

(List continued on next page.)

FOREIGN PATENT DOCUMENTS

| | | | |
|---|---|---|---|
| 1095796 | 12/1960 | Germany | 95/133 |
| 2264512 | 1/1974 | Germany | 95/133 |
| 3139-781 | 4/1983 | Germany | 96/122 |
| 52-72373 | 6/1977 | Japan | 96/130 |
| 63-88017 | 4/1988 | Japan | 96/121 |
| 3-127606 | 5/1991 | Japan | 96/108 |
| 1181692A | 9/1985 | U.S.S.R. | 95/133 |
| 1544475A1 | 2/1990 | U.S.S.R. | 95/131 |
| 1583151A1 | 8/1990 | U.S.S.R. | 95/133 |

*Primary Examiner*—Robert Spitzer
*Attorney, Agent, or Firm*—Steven J. Hultquist, Esq.; Janet R. Elliott

[57] ABSTRACT

A system for recovery of adsorbed gas remaining in a used storage and dispensing vessel containing sorbent material having residual sorbate gas thereon, when the vessel is taken out of service, in which the used storage and dispensing vessel is coupled in flow communication with at least one fresh storage and dispensing vessel containing sorbent material therein having sorptive capacity for the residual sorbate gas. The fresh vessel is maintained in a first zone and the used vessel is maintained in a second zone, at temperature and/or pressure conditions relative to one another that cause the residual sorbate gas to desorb from the sorbent material in the used storage and dispensing vessel and flow into the fresh storage and dispensing vessel for sorption of the residual sorbate gas on the sorbent material in the fresh storage and dispensing vessel. The system of the invention permits a substantially complete recovery of residual sorbate gas that would otherwise be lost when the used storage and dispensing vessel is taken out of service and decommissioned.

20 Claims, 2 Drawing Sheets

U.S. PATENT DOCUMENTS

| | | | |
|---|---|---|---|
| 5,089,244 | 2/1992 | Parent et al. | 95/133 X |
| 5,106,759 | 4/1992 | Addison | 95/127 X |
| 5,133,787 | 7/1992 | Diot et al. | 96/121 |
| 5,151,395 | 9/1992 | Tom | 502/67 |
| 5,302,187 | 4/1994 | Itoh et al. | 95/97 X |
| 5,409,526 | 4/1995 | Zheng et al. | 96/132 |
| 5,417,742 | 5/1995 | Tamhankar et al. | 95/96 |
| 5,518,528 | 5/1996 | Tom et al. | 95/103 |

RECLAIMING SYSTEM FOR GAS RECOVERY FROM DECOMMISSIONED GAS STORAGE AND DISPENSING VESSELS AND RECYCLE OF RECOVERED GAS

BACKGROUND OF THE INVENTION

1. Field of the Invention

This invention relates generally to storage and dispensing systems for the selective dispensing of gas(es) from a vessel or storage container in which the gas component(s) are held in sorptive relationship to a solid sorbent medium, and are desorptively released from the sorbent medium in the dispensing operation. More specifically, the invention relates to a method and apparatus for recovering residual gas from decommissioned storage and dispensing vessels of such type and recycling the recovered gas for subsequent storage and dispensing system use.

2. Description of the Related Art

The disclosure of U.S. Pat. No. 5,518,528 is hereby incorporated in its entirety by reference herein.

U.S. Pat. No. 5,518,528 issued May 21, 1996 in the names of Glenn M. Tom and James V. McManus, describes a gas storage and dispensing system which comprises an adsorption-desorption apparatus, for storage and dispensing of a gas, e.g., a gas selected from the group consisting of hydride gases, halide gases, and organometallic Group V compounds, including: a storage and dispensing vessel constructed and arranged for holding a solid-phase physical sorbent medium, and for selectively flowing gas into and out of said vessel; a solid-phase physical sorbent medium disposed in said storage and dispensing vessel at an interior gas pressure; a sorbate gas physically adsorbed on the solid-phase physical sorbent medium; and a dispensing assembly coupled in gas flow communication with the storage and dispensing vessel, and constructed and arranged to provide, exteriorly of the storage and dispensing vessel, a pressure below such interior pressure, to effect desorption of sorbate gas from the solid-phase physical sorbent medium, and gas flow of desorbed gas through the dispensing assembly. The dispensing assembly may comprise a pump or other means by which the gas is desorbed and dispensed from the vessel in use, and a mass flow controller may be employed to provide flow of dispensed gas at a selected value in use of the storage and dispensing system. Alternatively, in some applications such as ion implant applications, the end use environment may be at subatmospheric pressure, and such pump or other extraction means may not be required.

Regardless of the specific apparatus and means of extracting the sorbed gas from the sorbent material in the vessel and dispensing same to an exterior locus for use, there inevitably is a residual amount of gas left in the vessel at the time it is taken out of service, an action here referred to as decommissioning of the storage and dispensing vessel. Such decommissioning point may be determined by the inability to extract desorbed gas from the sorbent-containing vessel in a desired amount and at a desired rate within a meaningful period of time for the specific end-use application. This operational point may therefore be determined by the equipment constraints of the means for extracting the desorbed gas from the sorbent-containing vessel. For example, a mechanical pump may be employed which cannot satisfactorily operate at pressures below a specific subatmospheric pressure level, and/or the pressure drop over the dispensing manifold and connecting system piping and equipment components may not allow gas withdrawal from the vessel at a certain point because the $\Delta P$ required for gas flow is no longer being met.

At this termination point, the storage and dispensing vessel is taken out of service, and may be disposed of or else reconditioned for reuse. In reconditioning, the vessel may be "baked out" by subjecting same to elevated temperature, e.g., by disposing an insulated heating jacket about the vessel followed by heating of the jacket to heat the vessel and its contained sorbent.

Heating of the sorbent causes the residual sorbed gas to desorb from the sorbent and expand, so that it can readily be removed from the vessel. Such heating requires elevating the temperature of the vessel to sufficiently high temperature so that the sorbent is correspondingly heated to a suitable desorption temperature for the gas species being retained on and within the sorbent material. Due to the heavy metal walls of the vessel being heated (such walls embodying significant thermal ballast), such bake-out requires a very long time to accomplish, particularly where the vessel is of significant size and wall thickness. Further, the sorbent materials typically used in the storage and dispensing vessel for gas sorption are of relatively low thermal conductivity characteristics, a factor which further increases the time and energy required to effect desorption.

Alternatively, the storage and dispensing vessel may be coupled in closed flow communication with a scavenger vessel, so that the sorbate gas in the storage and dispensing vessel is desorbed and gas is removed down to extremely low levels by such gettering action of the scavenger. While ultimately, this method yields extremely high removals of residual gas from the storage and dispensing vessel, it is time-consuming and the residual gas is consumed in the scavenging process, and lost as a recoverable product for subsequent use.

Further, in applications such as ion implantation using gases such as arsine, phosphine and boron trifluoride, the amount of residual gas remaining in inventory in the storage and dispensing vessel is very significant, typically on the order of 10–30% of the total charge of the gas originally loaded on the sorbent material at initial filling of the storage and dispensing vessel with the gas to be stored and subsequently dispensed from the vessel. Accordingly, when the storage and dispensing vessel containing such residual inventory of gas sorbate is decommissioned and the residual inventory is lost by disposal of the vessel containing same, or by loss of such inventory of gas to the scavenger in a gas scavenging operation for renewing the vessel and sorbent material for reuse, there is significant wastage of gas. In this respect, it is necessary to completely remove the sorbate gas from the sorbent material in the vessel before the vessel can be refilled and placed again in service.

Substantially complete recovery of the sorbate gas from used storage and dispensing vessels may be particularly desired if the sorbate gas is very valuable, as may be the case, for example, for certain dopant gases employed in the semiconductor manufacturing industry, and/or very toxic or hazardous in character, so that stringent requirements exist for effecting complete removal of the sorbate gas from spent storage and dispensing vessels which are taken out of service and decommissioned.

It would therefore be a significant advance in the art, and is therefore an object of the present invention, to provide a means and method of recovering the adsorbed gas inventory in a storage and dispensing vessel of the above-described type which has been taken out of service for decommissioning.

Other objects and advantages of the invention will be more fully apparent from the ensuing disclosure and appended claims.

SUMMARY OF THE INVENTION

The present invention relates in a process aspect to a method for recovering and reusing adsorbed gas remaining in a storage and dispensing vessel of the aforementioned type, when the vessel is taken out of service for decommissioning.

Specifically, a "fresh" vessel containing sorbent material which is sorptive for the adsorbed gas (i.e., is less than fully loaded, and preferably is substantially "unloaded," with respect to the adsorbed gas) is coupled in flow communication with the "used" or "spent" vessels containing residual adsorbed gas on the sorbent material therein, and the temperature and/or pressure of the spent vessels is maintained at a relatively higher level than the respective temperature and/or pressure of the fresh vessel. As a result of the temperature and/or pressure differential between the respective fresh and spent vessels, and the decreasing character of sorptive capacity for a sorbate species with increasing temperature, the sorbate gas desorbs from the sorbent in the higher temperature and/or pressure spent vessels and flows to the fresh vessel containing sorbent material at lower temperature and/or pressure, over a period of time, the exact duration depending on such factors as the flow conductance of the respective tanks and their connecting piping, manifolding, etc., the magnitude of the temperature and/or pressure difference between fresh and used vessels, the loading level of the sorbate gas on the spent sorbent material in the used vessels (and the loading level of any sorbate on the sorbent in the fresh vessel) at commencement of the recovery operation, etc.

The transfer of the sorbate gas from the used vessels to the fresh vessel may be enhanced or facilitated by appropriate chilling of the fresh vessel and/or warming of the used vessels.

Further improvement in the rate of transfer of the sorbate gas from the used vessels to the fresh vessel may be achieved in some instances by flowing an inert purge gas through the sorbent beds in the used vessels, to "sweep" the interstitial void space sorbate gas and head space gas in the vessel (above the sorbent bed in the interior volume of the vessel) out of the used vessel to the fresh vessel. Such inert (non-adsorbed) purge gas will additionally maximize the concentration gradient driving force for desorption of the sorbate from the sorbent material in the used vessel.

As a further enhancement technique for transferring the residual sorbate gas from a used vessel to the fresh one, a vacuum pump may be joined to the flow circuit interconnecting the used vessels and the fresh vessel. Such vacuum pump may be actuated to vacuum desorb the sorbate gas from the sorbent material in the used vessels, followed by shutdown of the pump, to cause the desorbed sorbate gas to flow to and sorb on the sorbent material in the fresh vessel.

It will therefore be appreciated that the sorbate gas can be flowed from a used vessel containing a substantial residuum of sorbate gas, to a fresh vessel, so that the latter is filled at least in part by the desorbed gas from the used vessel. If a vessel contains 10–30% by weight of the originally loaded gas at the time it is taken out of service, it is apparent that filling a fresh vessel with desorbate gas from 3–10 used vessels will substantially fully fill the fresh vessel. Accordingly, the present invention contemplates that multiple used vessels may be "ganged" or manifolded together to provide a source of (desorbed) sorbate gas which can concurrently be used to fill the fresh vessel.

In an apparatus aspect, the present invention relates to a residual sorbate gas recovery system comprising a first zone for holding at least one used storage and dispensing vessel at a relatively higher temperature and/or pressure, and a second zone for holding at least one fresh storage and dispensing vessel at a relatively lower temperature and/or pressure, and a flow communication circuit for interconnecting the used storage and dispensing vessel(s) and the fresh storage and dispensing vessel(s) for flowing desorbing sorbate gas from the used vessel(s) to the fresh vessel(s) for adsorption of desorbed sorbate gas in the fresh vessel(s).

Such gas system may optionally additionally comprise a vacuum pump coupled with the flow communication circuit for assisting the desorption of sorbed gas from the sorbent in the used vessel(s) to enhance transfer of sorbate gas from the used vessel(s) to the fresh vessel(s).

In a still further aspect, the apparatus of the type broadly described above may additionally optionally comprise an inert purge gas reservoir coupled with the flow communication circuit for flowing the purge gas from the reservoir through the used vessel(s) for purge gas displacement of sorbate gas from the used vessel(s) to the fresh vessel(s), to enhance transfer of the sorbate gas from the used vessel(s) to the fresh vessel(s).

Other aspects, features and embodiments of the invention will be more fully apparent from the ensuing disclosure and appended claims.

DETAILED DESCRIPTION OF THE INVENTION AND PREFERRED EMBODIMENTS THEREOF

Figure 1:
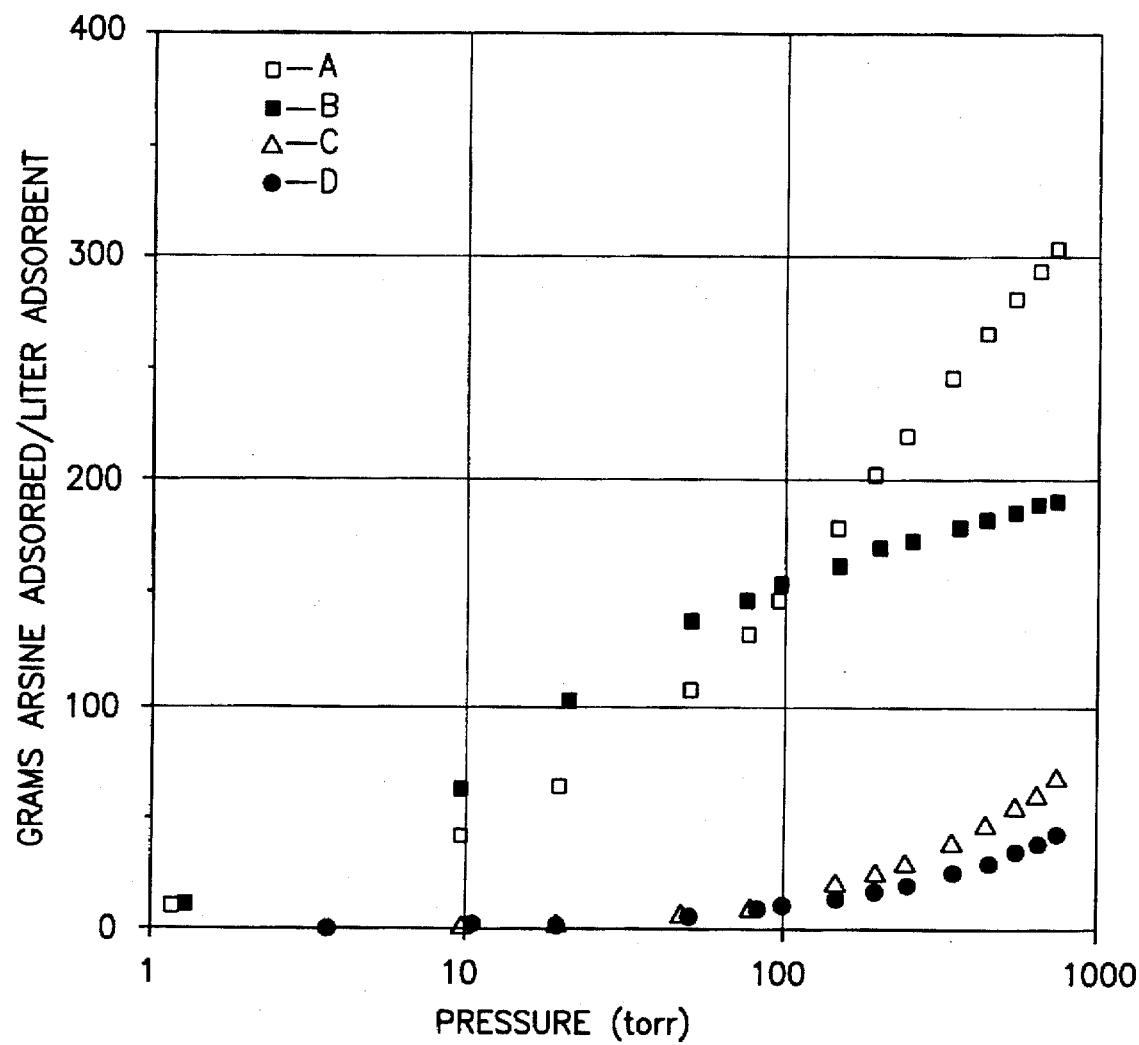
FIG. 1 is a plot of arsine adsorption isotherms at 20° C. for several different sorbent materials usefully employed in the practice of the present invention.

Referring now to the drawings, there is shown in FIG. 1, there is shown a plot of arsine adsorption isotherms at 20° C. for several different sorbent materials usefully employed in the practice of the present invention. The adsorption isotherm is plotted as a graph of grams arsine adsorbed per liter of adsorbent, as a function of pressure in torr, for each of the following adsorbent materials: a representative bead activated carbon (curve A), a zeolite 5A material (curve B), a silica gel material (curve C) and a polystryrene-divinylbenzene macroreticulate polymer material, commercially available under the trademark "Amberlite" from Rohm & Haas, Philadelphia, Pa. (curve D).

The data shown in FIG. 1 reflect the fact that it is difficult to completely remove sorbate gas from a sorbent material in a storage and dispensing vessel holding sorbent material at least partially loaded with the sorbate species, unless very low pressures are employed. Even at 100 torr, a substantial amount of the sorbate gas remains on the various sorbent materials (approximately 150 grams arsine per liter of the activated carbon and zeolite adsorbents, and approximately 10 grams arsine per liter of the silica gel and macroreticulate polymer material. Further, at lower pressure levels, the slope of the isotherm curve is low and differential reduction in pressure does not yield significant additional desorption of gas.

These factors, together with the previously mentioned factors of pumping and conductance constraints, result in the wastage of residual sorbate gas discussed hereinabove when a vessel containing sorbent material loaded only with residual sorbate gas is taken out of service.

Figure 2:
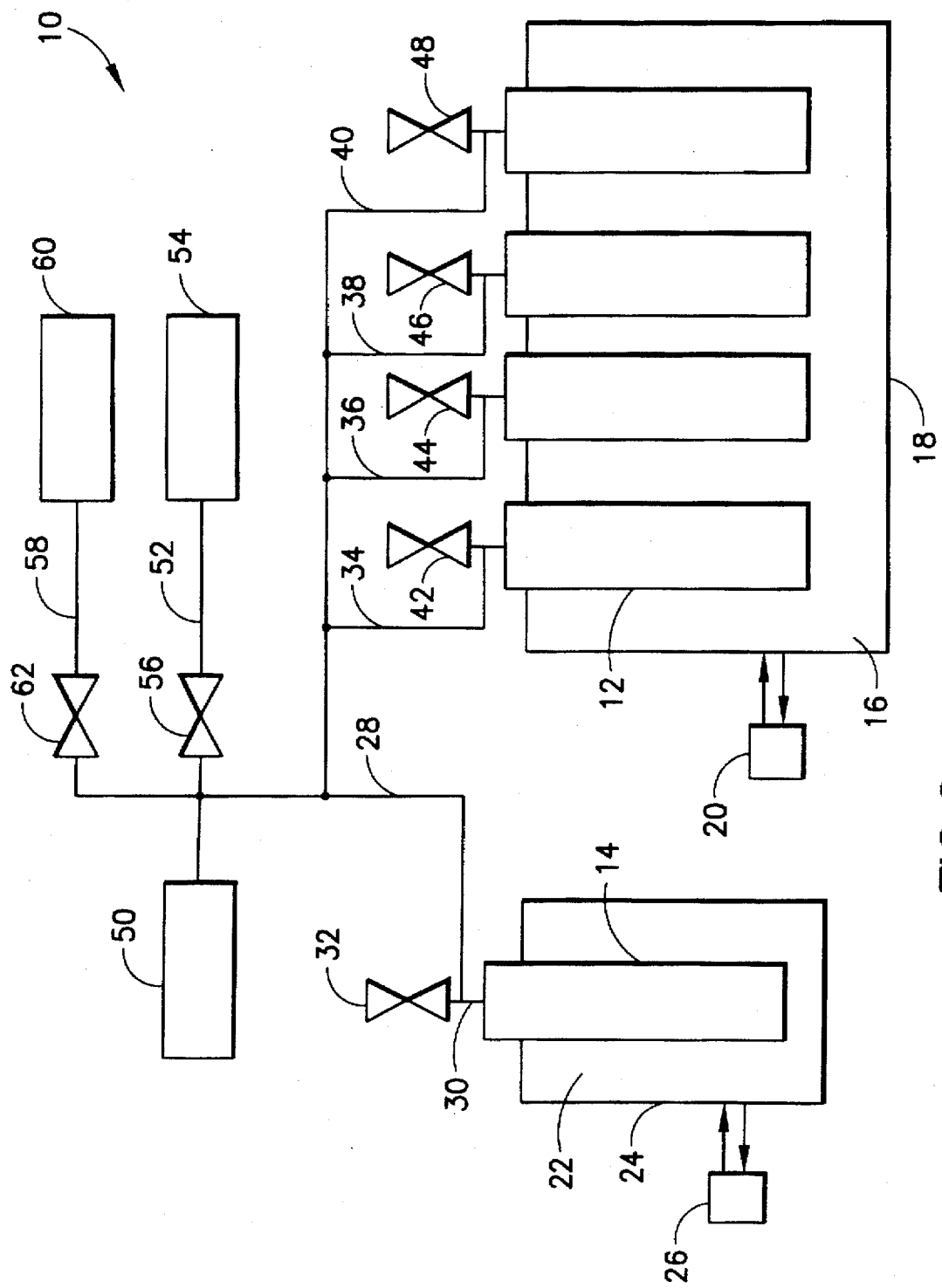
FIG. 2 is a schematic representation of a storage and dispensing vessel reclamation and sorbate gas recovery facility, for withdrawing sorbate gas from used storage and dispensing vessels and transporting same to a fresh storage and dispensing vessel maintained at lower temperature than the used storage and dispensing vessels.

FIG. 2 is a schematic representation of a storage and dispensing vessel reclamation and sorbate gas recovery facility 10, for withdrawing sorbate gas from used storage and dispensing vessels 12 and transporting same to a fresh storage and dispensing vessel 14 maintained at lower temperature than the used storage and dispensing vessels. Each of the storage and dispensing vessels 12 and 14 may be constructed as disclosed in U.S. Pat. No. 5,518,528, comprising a leak-tight vessel containing a sorbent medium such as a material described above in connection with FIG. 1 hereof. On the bed of sorbent material in the interior volume of the used vessels 12 is residual sorbate gas representing the gas inventory which has remained on the sorbent material when the vessels 12 have been taken out of service at the end of their useful service life. The sorbent bed in fresh vessel 14, on the other hand, initially has no or extremely low loading of sorbate species thereon, so that its capacity is maximized for the subsequent recovery of the residual sorbate gas from the sorbent beds in the used vessels 12.

As illustrated, the residual sorbate gas recovery system 10 includes warm zone 16 within a warming chamber 18 for holding the used storage and dispensing vessels 12 at a relatively higher temperature, e.g., at room (ambient) temperature of for example 20°–30° C., up to elevated temperature, e.g., 100° C. or even higher, by appropriate heater 20 coupled in operative relationship with the warming chamber, and arranged thermostatically with suitable controls (not shown) for maintaining the temperature of the warming zone 16 within chamber 18 at a desired elevated level for effecting desorption of the sorbate gas from the used storage and dispensing vessels.

The recovery system 10 further includes a cool zone 22 within chamber 24 for holding at least one fresh storage and dispensing vessel 14 at a relatively lower temperature, e.g., 15° C. down to −196° C. or even lower temperature, below the temperature of the warm zone 16 in which the used storage and dispensing vessels 12 are reposed. For such purpose, the cool zone 22 may be constituted by a cryostat or refrigerated enclosure equipped with a refrigeration unit 26 coupled in operative relationship thereto, and provided with suitable controls (not shown) for maintaining the temperature of the cool zone within chamber 24 at a selected low temperature for effecting the transfer of residual sorbate gas from the used storage and dispensing vessels 12 to the fresh vessel 14.

A flow communication circuit comprising manifold 28 is employed for interconnecting the used storage and dispensing vessels 12 and the fresh storage and dispensing vessel 14 for flowing desorbing sorbate gas from the used vessels to the fresh vessel for adsorption of desorbed sorbate gas in the fresh vessel 14.

The manifold 28 is joined to the fresh vessel 14 by branch line 30 having vent valve 32 therein. The manifold is correspondingly joined to the used vessels 12 by branch lines 34, 36, 38, and 40 having vent valves 42, 44, 46 and 48, coupled thereto, respectively.

The manifold 28 is provided with pressure gauge 50 for monitoring the pressure in the manifold flow circuit. Joined to the manifold 28 are branch line 52 connected to vacuum pump 54 and having flow control valve 56 therein, by means of which vacuum may be applied in the manifold 28, and branch line 58 joined to purge gas reservoir 60 having flow control valve 62 therein, for selectively introducing purge gas into the manifold 28.

The vacuum pump 54 coupled with the flow communication circuit may be selectively actuated for assisting the desorption of sorbed gas from the sorbent in the used vessels 12, to cause same to flow from the sorbent in the used vessels 12 into the manifold 28, for subsequent flow of sorbate gas from the manifold 28 to the fresh vessel 14.

An inert purge gas may be provided in the purge gas reservoir 60 coupled with the flow communication circuit, for flowing the purge gas from the reservoir through the used vessels 12 for purge gas displacement of sorbate gas from the used vessels into the manifold 28 and subsequent flow of the displaced sorbate gas (from the interstitial void space and the head space of the used vessels 12) into the manifold 28 and into the fresh vessel 14, to enhance transfer of the sorbate gas from the used vessels to the fresh vessel. Subsequent to, or concurrently with such purge gas displacement, the unadsorbed purge gas, which may comprise a gas such as argon, nitrogen, etc., for which the sorbent material has no or little sorptive affinity, may be vented from the fresh vessel via opening of vent valve 32 in line 30. The purge gas flow thus is controlled by valve 62 in line 58, and the vacuum exerted by vacuum pump 54 is effected by actuation of the vacuum pump and opening of control valve 56 in line 52.

By the system of a type as illustratively shown in FIG. 2, it is possible to recover substantially all of the residual sorbate gas from the used vessels 12 and to transport same to the sorbent in vessel 14 for sorption and retention in the sorbent bed within vessel 14. After the recovery operation, the spent vessels, now substantially fully exhausted of the sorbate gas, may be disposed of or otherwise reconditioned without loss of the sorbate gas which heretofore has been lost when the vessels are taken out of service.

While the invention has been illustratively shown as comprising a multiplicity of used vessels 12 coupled to a manifold 28 for effecting the recovery of sorbent gas, it will be recognized that any suitable number of vessels may be so coupled in flow communication with the fresh vessel or vessels, and thus that similar manifolding may be employed to concurrently fill a multiplicity of fresh vessels. Thus all permutations of one or more used vessels and one or more fresh vessels are contemplated, the choice of which may be determined within the skill of the art for given types of vessels and sorbate gases in a specific end use of the present invention.

Accordingly, while the invention has been described illustratively herein with reference to specific embodiments, features and modifications, it will be appreciated that the utility of the invention is not thus limited, but rather extends to other modifications, features and embodiments, and accordingly the invention is to be broadly construed as including within its scope all such variation, modifications and other embodiments.

What is claimed is:

1. A method for recovery of adsorbed gas remaining in at least one used storage and dispensing vessel containing sorbent material having residual sorbate gas thereon, when the vessel is taken out of service, said method comprising:

coupling said used storage and dispensing vessel in flow communication with at least one fresh storage and dispensing vessel containing sorbent material therein having sorptive capacity for said residual sorbate gas;

maintaining the fresh vessel at temperature and/or pressure conditions relative to one another that cause the residual sorbate gas to desorb from the sorbent material in said used storage and dispensing vessel and flow into the fresh storage and dispensing vessel for sorption of the residual sorbate gas on the sorbent material in the fresh storage and dispensing vessel.

2. A method according to claim 1, wherein the temperature of the fresh storage and dispensing vessel is maintaining at a level below the temperature of the used storage and dispensing vessel to cause the residual sorbate gas to desorb from the sorbent material is said used storage and dispensing vessel and flow into the fresh storage and dispensing vessel for sorption of the residual sorbate gas on the sorbent material in the fresh storage and dispensing vessel.

3. A method according to claim 1, wherein the pressure of the fresh storage and dispensing vessel is maintained at a level below the pressure of the used storage and dispensing vessel to cause the residual sorbate gas to desorb from the sorbent material in said used storage and dispensing vessel and flow into the fresh storage and dispensing vessel for sorption of the residual sorbate gas on the sorbent material in the fresh storage and dispensing vessel.

4. A method according to claim 1, wherein the temperature and pressure of the used storage and dispensing vessel are each maintained at a level below the temperature and pressure, respectively, of the fresh storage and dispensing vessel to cause the residual sorbate gas to desorb from the sorbent material in said used storage and dispensing vessel and flow into the fresh storage and dispensing vessel for sorption of the residual sorbate gas on the sorbent material in the fresh storage and dispensing vessel.

5. A method according to claim 1, wherein more than one used storage and dispensing vessel is coupled in flow communication with said fresh storage and dispensing vessel containing sorbent material therein having sorptive capacity for said residual sorbate gas.

6. A method according to claim 1, wherein more than one used storage and dispensing vessel is coupled in flow communication with more than one fresh storage and dispensing vessel containing sorbent material therein having sorptive capacity for said residual sorbate gas.

7. A method according to claim 1, wherein the fresh vessel is maintained at said temperature and/or pressure conditions for sufficient time to achieve substantially complete desorption of the residual sorbate gas from the sorbent material in the used storage and dispensing vessel and flow into the fresh storage and dispensing vessel.

8. A method according to claim 1, further comprising flowing an inert purge gas through the sorbent material in the used vessel, to sweep interstitial void space sorbate gas and head space sorbate gas in the used vessel out of the used vessel to the fresh vessel.

9. A method according to claim 1, further comprising exerting vacuum on the sorbent material in the used storage and dispensing vessel to vacuum desorb sorbate gas from the sorbent material in the used vessel, and flowing resultingly desorbed sorbate gas to the fresh vessel for adsorption on the sorbent material in the fresh vessel.

10. An apparatus for recovery of adsorbed gas remaining in at least one storage and dispensing vessel containing sorbent material having residual sorbate gas thereon, when the vessel is taken out of service, said apparatus comprising:

a first zone for holding the used storage and dispensing vessel at a first temperature and/or pressure condition;

a second zone for holding at least one fresh storage and dispensing vessel containing sorbent material therein having sorptive capacity for said residual sorbate gas, at a second temperature and/or pressure condition lower than the first temperature and/or pressure condition; and a flow communication circuit for interconnecting the used storage and dispensing vessel and the fresh storage and dispensing vessel for flowing desorbing sorbate gas from the used vessel to the fresh vessel for adsorption of desorbed sorbate gas on the sorbent material in the fresh vessel;

mean for maintaining the fresh vessel and the used vessel at temperature and/or pressure conditions relative to one another that cause the residual sorbate gas to desorb from the sorbent material in the used storage and dispensing vessel and flow into the flesh storage and dispensing vessel for sorption of the residual sorbate gas on the sorbent material in the fresh storage and dispensing vessel.

11. Apparatus according to claim 10, wherein said means maintain the fresh vessel and the used vessel at temperature conditions relative to one another that cause the residual sorbate gas to desorb from the sorbent material in the used storage and dispensing vessel and flow into the fresh storage and dispensing vessel for sorption of the residual sorbate gas on the sorbent material in the fresh storage and dispensing vessel.

12. Apparatus according to claim 10, wherein said means maintain the fresh vessel and the used vessel at pressure conditions relative to one another that cause the residual sorbate gas to desorb from the sorbent material in the used storage and dispensing vessel and flow into the fresh storage and dispensing vessel for sorption of the residual sorbate gas on the sorbent material in the fresh storage and dispensing vessel.

13. Apparatus according to claim 10, wherein said means maintain the fresh vessel and the used vessel at pressure and temperature conditions relative to one another that cause the residual sorbate gas to desorb from the sorbent material in the used storage and dispensing vessel and flow into the fresh storage and dispensing vessel for sorption of the residual sorbate gas on the sorbent material in the fresh storage and dispensing vessel.

14. Apparatus according to claim 10, further comprising a vacuum pump coupled with the flow communication circuit for assisting the desorption of sorbed gas from the sorbent material in the used vessel to enhance transfer of sorbate gas from the used vessel to the fresh vessel.

15. Apparatus according to claim 10, further comprising a purge gas reservoir coupled with the flow communication circuit for flowing purge gas from the reservoir through the used vessel for purge gas displacement of sorbate gas from the used vessel to the fresh vessel, to enhance transfer of the sorbate gas from the used vessel to the fresh vessel.

16. Apparatus according to claim 10, wherein more than one used storage and dispensing vessel is coupled with said flow communication circuit.

17. Apparatus according to claim 10, wherein more than one fresh storage and dispensing vessel is coupled with said flow communication circuit.

18. Apparatus according to claim 10, comprising means for monitoring the pressure in the flow communication circuit.

19. Apparatus according to claim 10, wherein the first zone comprises a chamber and means for heating thereof.

20. Apparatus according to claim 10, wherein the second zone comprises a chamber and means for cooling thereof.

* * * * *

UNITED STATES PATENT AND TRADEMARK OFFICE
CERTIFICATE OF CORRECTION

PATENT NO.    : 5,676,735
DATED         : October 14, 1997
INVENTOR(S)   : McManus It is certified that error appears in the above-identified patent and that said Letters Patent is hereby corrected as shown below:

Column 7,
Line 14, "is" should be -- in --

Signed and Sealed this

Twelfth Day of April, 2005

JON W. DUDAS
*Director of the United States Patent and Trademark Office*